United States Patent [19]

Parker

[11] 4,307,706

[45] Dec. 29, 1981

[54] FLAT PLATE SOLAR BOILERS

[76] Inventor: Louis W. Parker, 2040 N. Dixie Hwy., Ft. Lauderdale, Fla. 33305

[21] Appl. No.: 215,977

[22] Filed: Dec. 12, 1980

Related U.S. Application Data

[62] Division of Ser. No. 171,866, Jul. 24, 1980, abandoned.

[51] Int. Cl.³ .............................................. F24J 3/02
[52] U.S. Cl. ..................................... 126/417; 126/435
[58] Field of Search ............... 126/417, 433, 435, 427, 126/444, 446, 448, 449, 450, 421; 165/170, 166

[56] References Cited

U.S. PATENT DOCUMENTS

| | | | |
|---|---|---|---|
| 3,996,759 | 12/1976 | Meckler | 126/435 |
| 4,084,580 | 4/1978 | Roark | 126/435 |
| 4,124,018 | 11/1978 | Murray | 126/435 |
| 4,128,124 | 12/1978 | Worthington | 126/427 |
| 4,129,177 | 12/1978 | Adcock | 126/435 |
| 4,205,662 | 6/1980 | Rhodes et al. | 126/444 |
| 4,232,820 | 11/1980 | Ritter et al. | 126/433 |
| 4,265,223 | 5/1981 | Miserlis | 126/417 |
| 4,270,521 | 6/1981 | Brekke | 126/433 |
| 4,270,523 | 6/1981 | Van Heel | 126/435 |
| 4,281,639 | 8/1981 | Kuronen | 126/435 |

Primary Examiner—Daniel J. O'Connor
Attorney, Agent, or Firm—Pollock, Vande Sande & Priddy

[57] ABSTRACT

A flat plate solar boiler, having one face which is exposed to solar radiation to heat a liquid within the boiler, also has its opposing face, or the dark side of the boiler, indirectly heated by solar radiation thereby to minimize heat losses from the boiler and to apply further input heat to the boiler. The dark side or second face of the solar boiler is indirectly heated through a metallic plate which is in conductive engagement with the second face of the boiler, extends beyond at least one of the side edges of the boiler, and has a radiation absorptive material on an extension portion of the plate facing the sun. In an alternative embodiment, the second face of the boiler is heated by use of a second solar boiler which is disposed in laterally spaced relation to the first boiler to provide a heated liquid which is circulated past the second face of the first boiler.

9 Claims, 4 Drawing Figures

FLAT PLATE SOLAR BOILERS

This is a division, of application Ser. No. 171,866, filed July 24, 1980, now abandoned.

BACKGROUND OF THE INVENTION

The present invention relates to improved flat plate solar boiler configurations which are constructed to increase the maximum temperature of the water or steam produced in such boilers. The boilers of the present invention may be used in various solar applications and, in particular, can be used in systems of the type described in my prior U.S. Pat. No. 3,919,998, issued Nov. 18, 1975, for "Convection-Type Solar Heating Unit" and No. 4,076,025 issued Feb. 28, 1978, for "Solar Steam Boiler". The disclosures of these prior patents are incorporated herein by reference.

High temperature water or steam is needed in many applications such as, for example, absorption type air conditioners. In addition, the generation of high temperature water is highly desirable to facilitate the storage of heated water, e.g., inasmuch as boilers of known configuration are normally constructed to withstand pressures as high as 100 psi, water may be safely heated in such boilers to a temperature of over 300° F. without boiling and, at this temperature, much more energy can be stored than in conventional household hot water heaters. By mixing the super heated water in such a boiler with, for example, cold water through a thermostatically controlled valve, water at any desired final temperature can be readily obtained.

Flat plate solar boilers of known configuration are capable of heating water to a temperature wherein the heat which is supplied to the boiler by solar radiation equals the heat which is removed from the boiler by radiation or otherwise. When a balance between the heat supplied to and removed from the boiler is achieved, further increase of temperature ceases. Heat is removed from the boiler by radiation, or by conduction, or by removal of hot water or steam from the boiler. Of these three mechanisms, heat loss by conduction is comparatively insignificant, and heat loss by removal of hot water or steam can be controlled; but the loss of heat from the boiler due to radiation is, for the most part, unavoidable and therefore represents a limiting factor which determines the maximum temperature to which water in the boiler may be heated.

In flat plate solar boilers which have been suggested heretofore, only one side of the boiler is heated by incident solar radiation from the sun. Radiation losses occur, however, from both sides of the boiler. The side which is remote from the sun, normally termed the dark side of the boiler, usually faces a heat reflective material which functions to make radiation heat loss from the dark side of the boiler less than that from the sun side of the boiler. Nevertheless, radiation heat losses from the dark side of the boiler are not negligible, and, in known boiler configurations, is determined by the quality of the heat reflecting material employed, e.g., aluminum foil, and is also determined by the quality of the thermal insulation material which is normally disposed behind the heat reflecting material to minimize radiation heat losses from the reflecting material itself resulting from the heating of said heat reflecting material during the operation of the boiler.

The present invention, in contrast to these known arrangements, minimizes radiation losses from a flat plate solar boiler, and increases the temperature to which the liquid in such boilers may be heated, by delivering solar radiation generated heat to both the sun side and the dark side of the solar boiler.

SUMMARY OF THE INVENTION

In accordance with the present invention, a flat plate solar boiler comprises a metal-wall container having a liquid therein, with a first face of the boiler being oriented toward the sun to be heated by solar radiation incident on said first face, in generally conventional fashion. The improvement in the present invention includes, moreover, means responsive to solar radiation for supplying additional heat to a second face of the boiler opposite to said first face, i.e., to the dark face of the boiler. As a result, the liquid in the container is heated by solar radiation generated heat that is delivered to both the first and second faces of the boiler, whereby radiation heat losses from the dark face of the boiler are eliminated and the dark face of the boiler is, instead, actually utilized to provide additional input heat to the boiler.

The means responsive to solar radiation for supplying additional heat to the second face of the boiler can, in accordance with one embodiment of the invention, comprise a metal plate which is in conductive engagement with the dark face of the boiler and which extends beyond the side edges of the boiler to provide a laterally spaced portion of the plate that faces the sun. This laterally spaced portion of the plate is provided, moreover, with a radiation absorption material thereon which is heated by incident solar radiation and which accordingly acts to heat the plate so that the plate, in turn, delivers heat to the dark side of the boiler. In this way, the sun side of the boiler is directly heated by incident solar radiation, and the dark side of the boiler is indirectly heated by incident solar radiation through the said added plate and the radiation absorption material thereon.

In accordance with a second embodiment of the invention, the dark side of the boiler may be heated by means of a second solar boiler which is disposed in laterally spaced relation to the first boiler. The second solar boiler conains a liquid which is adapted to be heated by solar radiation incident on said second boiler, and heat transfer means are provided for circulating heated liquid from the second solar boiler through a flow path which extends across the dark side of the first solar boiler. The heat transfer arrangement employed can include a third solar boiler which is in engagement with the dark side of the first solar boiler, and through which liquid from the second solar boiler passes.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1A:
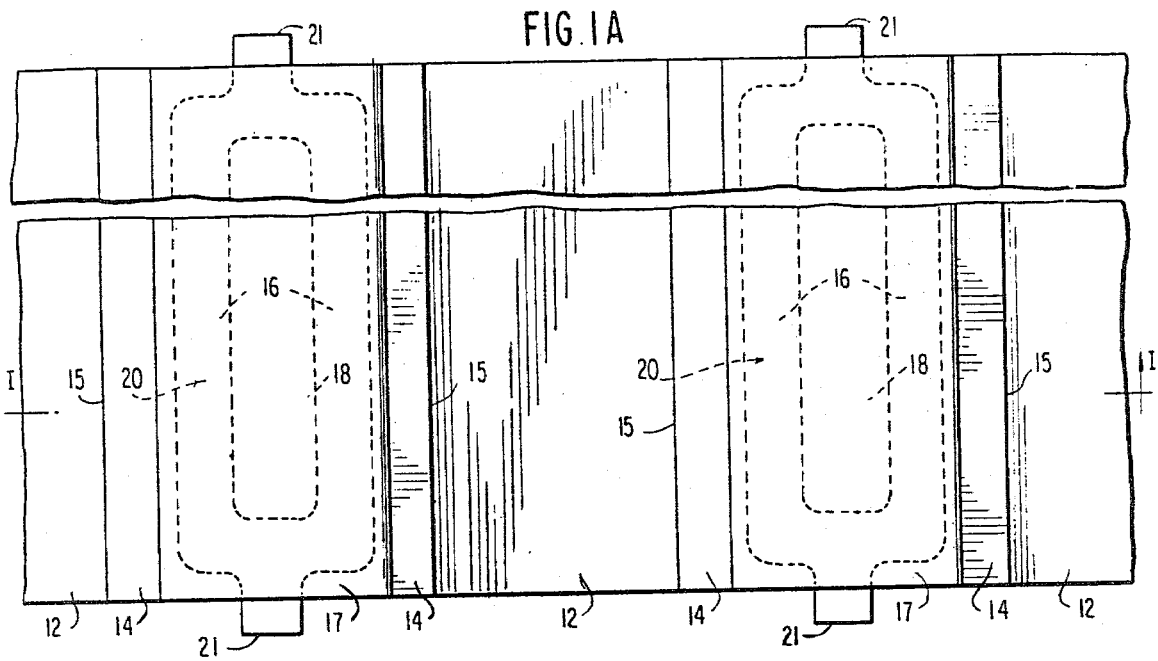
FIG. 1A is a plan view of an improved flat plate solar boiler system constructed in accordance with a first embodiment of the present invention.
Figure 1B:
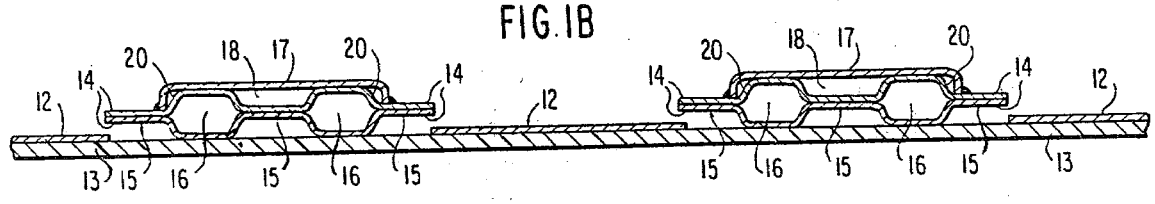
FIG. 1B is a cross-sectional view of FIG. 1A, taken on line I—I.

Referring initially to FIGS. 1A and 1B, the improved flat plate solar boiler system of the present invention comprises a plurality of flat plate solar boilers 20, each of which is of corrugate cross section as best shown in FIG. 1B. The several boilers 20 are each of elongated comparatively narrow configuration and are disposed in laterally spaced, generally axially parallel relation to one another. Each boiler comprises a pair of metallic sheets 14, e.g., copper sheets, which are attached to one another along elongated narrow areas 15, and which are bent away from one another in the regions between said areas 15 to define, in each boiler 20, a pair of elongated flat-crested cavities 16. As best shown in FIG. 1A, the opposing ends of the cavities 16 in each boiler join one another at larger common cavities disposed adjacent the opposing ends of the boiler, and these larger cavities in turn merge into fittings 21 for attachment to associated water lines. Conventional flat plate solar boilers suggested heretofore normally have ten or more longitudinal cavities such as 16, and the total width of a given boiler 20 is normally two feet or more. In the present invention, however, each boiler 20 is constructed so that it is only about six inches in width, and a plurality of these elongated narrow boilers 20 are connected together with one another in the fashion shown in FIGS. 1A and 1B, and their several fittings 21 are also connected together for connection to external equipment.

The flat crests of the elongated narrow cavities 16 in each boiler are, in accordance with the present invention, covered with a flat metallic plate 17 to define the sun side of the boiler. All outer surfaces of each boiler facing the sun, including the exterior surface of each flat plate 17, are covered with a radiation absorption material which operates to absorb heat from solar radiation incident on the sun side of the boiler. The provision of plates 17 increases the efficiency of the boiler when compared with conventional boilers, inasmuch as such flat surfaces can be oriented at right angles to the sun's rays, even though the boiler surface itself is of ribbed or corrugate configuration. As best shown in FIG. 1B, each flat plate 17 cooperates with the underlying ribbed configuration of the boiler to define an enclosed space 18 which is closed at its opposing ends, and these spaces 18 can simply be filled with air or, if desired, can be filled with a heat conducting liquid or solid material.

The several boilers 20 are interconnected to one another by a metallic plate 13 which is engagement with the dark side of each boiler and which extends continuously from one to the next of the several boilers 20. Due to the lateral spacing between the several boilers 20, the plate 13 includes portions 12 which are disposed between adjacent boilers and which is also exposed to incident solar radiation to be heated thereby. The outer surfaces of plate 13 between the boilers 20, and facing the sun, is also covered with the radiation absorption material e.g., by black nickel plates, which are heated by the solar radiation that is incident on plate 13 in the spaces 12 between the boilers; and, as a result, the plate 13 is also heated by the sun and operates to deliver heat, by conduction, to the back surfaces or dark sides of the several boilers 20.

When the boilers 20 are delivering steam or hot water, they are necessarily at a lower temperature than plate 13, and accordingly they can absorb heat from plate 13. It has been found that metal plate 13 sometimes reaches a temperature well in excess of 300° F. The heat which is supplied to the dark sides of boilers 20 through plate 13 acts to eliminate heat losses from the dark side of the boiler, and actually delivers additional heat to the liquid in each boiler through the dark side of the boiler, whereby the temperature of the liquid in each boiler can be made substantially higher, and maintained at a considerably higher temperature, than has been possible in conventional flat plate solar boilers suggested heretofore.

Figure 2A:
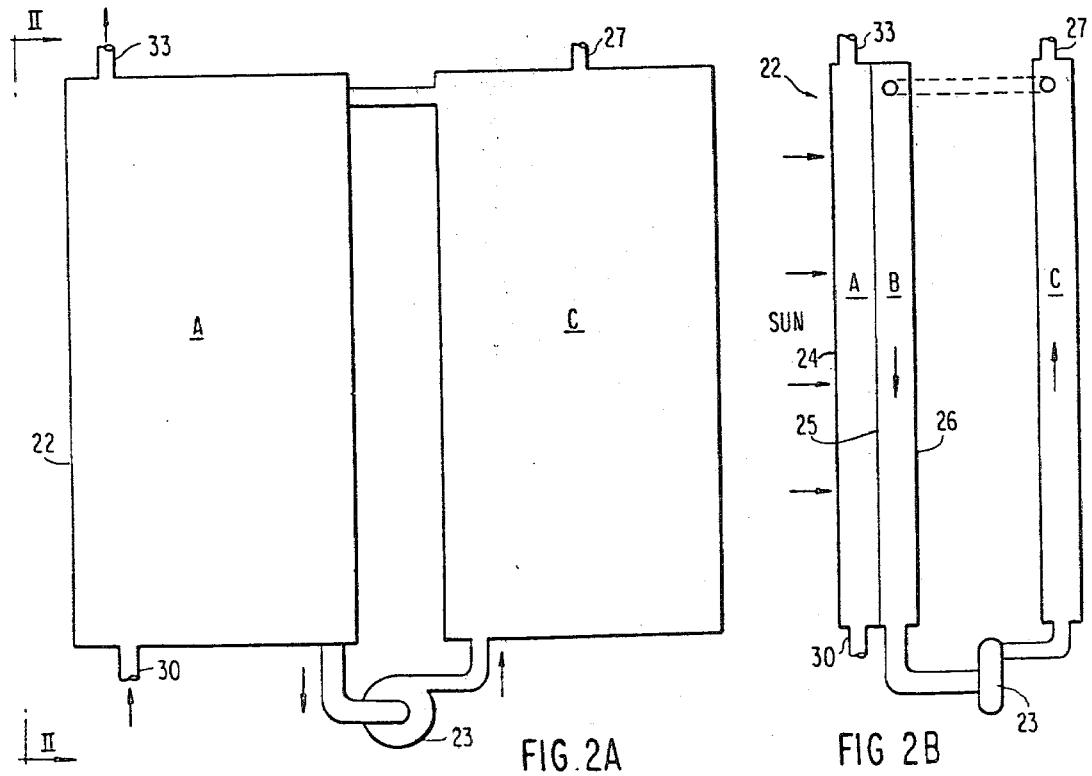
FIG. 2A is a plan view of a second embodiment of the invention.
Figure 2B:
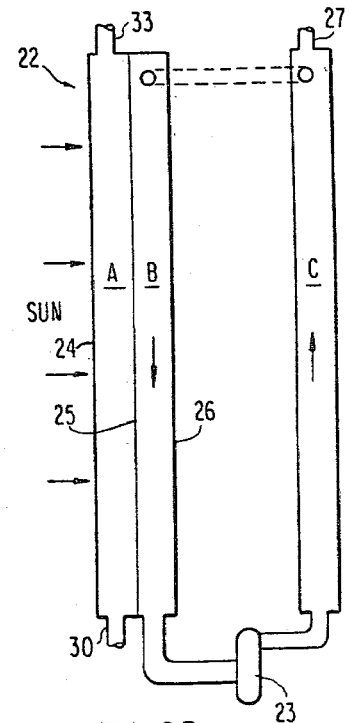
FIG. 2B is an end view of the system shown in FIG. 2A, taken on line II—II.

The second embodiment of the invention operating in accordance with the foregoing general principles is shown in FIGS. 2A and 2B. In this alternative arrangement, a flat plate solar boiler 22 is fabricated of three metallic sheets 24, 25, 26 which are disposed in spaced relation to one another as best shown in FIG. 2B. The opposing ends of sheets 24 and 25 are interconnected to one another, and to water fittings associated with external equipment, thereby to define a first flat plate solar boiler A whose outer face, i.e., sheet 24, is exposed to incident solar radiation. Sheet 25 is further associated with sheet 26 to define a second flat faced solar boiler B, one wall of which, 25, is common to solar boiler A; and this second boiler B functions essentially to provide a fluid flow path for the circulation of heated fluid past the dark side, or side 25, of solar boiler A.

The heated fluid which is circulated past the dark side of boiler A, through boiler B, is produced by the further solar boiler C, which may be of conventional configuration, that is disposed in laterally spaced relation to boilers A/B as best shown in FIG. 2A. Boiler C is filled with a mixture of water and trichloroethylene, or any other suitable high boiling point liquid such as crankcase oil, so that the liquid in boiler C is heated by the solar energy which is incident on the face thereof exposed to the sun. The heated liquid in boiler C is circulated through boiler B, thereby to heat the dark side of boiler A, by means of a small pump 23. Pump 23 is not necessary, however, if the system shown is operated in such fashion that large amounts of heat are removed from boiler A, for in such circumstances the dark side of boiler A will be cooler than the liquid which is being circulated through boilers B and C, and convection currents will keep the liquid moving from boiler C to boiler B.

An outlet 27 is provided in boiler C to permit the boilers B and C to be filled with liquid and, if desired, outlet 27 can be fitted with an appropriate relief and/or control valve to assure that the pressure within boilers B and C is maintained at a desired value, e.g., atmospheric pressure.

Cold water is supplied to boiler A through an inlet line 30 connected to the bottom of a storage tank (not shown). The high temperature water at the outlet 33 of solar boiler A is fed to the top of the aforementioned storage tank, where it sets up a circulation by convection within the said tank with the cold water supplied to the bottom of said tank. Said storage tank is located several feet above the solar boiler.

While I have thus described preferred embodiments of the present invention, many variations will be apparent to those skilled in the art. It should, therefore, be understood that the foregoing description is intended to be illustrative only and not limitative of the present invention, and all such variations and modifications as are in accord with the principles described are meant to fall within the scope of the appended claims.

Having thus described my invention, I claim:

1. A solar boiler comprising a container having a liquid therein, said container having a first metallic surface on one side of said container adapted to face the sun and adapted to be heated by solar energy incident on said first surface thereby to heat the liquid in said container, said container having a second metallic surface on the opposite side of said container disposed in spaced relation to said first surface and isolated from direct exposure to the sun by said first surface and the liquid in said container, radiation absorption means laterally spaced from the said first and second surfaces of said container, said radiation absorption means being exposed to the sun and being adapted to be heated by solar energy incident thereon, said radiation absorption means comprising a second solar boiler disposed in laterally spaced relation to said container and having further liquid therein adapted to be heated by solar energy incident on said second solar boiler, and heat transfer means connecting said radiation absorption means to said second surface of said container for conducting heat from said radiation absorption means to said second surface whereby heat is delivered simultaneously to both sides of said container when solar energy is incident on said first surface of said container and on said laterally spaced radiation absorption means, said heat transfer means comprising means defining a liquid flow path which extends across the exterior of said second surface of said container, and means for circulating heated liquid from said second solar boiler through said liquid flow path thereby to supply heat to said second surface of said container.

2. The solar boiler of claim 1 wherein said means defining said liquid flow path includes a third boiler adjacent to and substantially coextensive with the second surface of said container.

3. The solar boiler of claim 1 wherein said second surface of said container constitutes one of the walls of said third boiler.

4. The solar boiler of claim 1 wherein said means for circulating said heated liquid comprises pumping means.

5. A solar boiler comprising first, second and third substantially coextensive nontransparent metallic sheets which are disposed in spaced relation to one another, the edges of said first and second metallic sheets being interconnected to one another to define a first container, a liquid in said first container, said first sheet being adapted to face the sun and adapted to be heated by solar energy incident thereon for heating the liquid in said first container, said second and third sheets being isolated from direct exposure to the sun by their positional relationship relative to one another and relative to said first sheet, the edges of said second and third sheets being interconnected to one another to define a second container, a third container disposed in laterally spaced relation to said first and second containers, said third container having a surface which is adapted to face the sun and adapted to be heated by solar energy incident thereon, flow lines interconnecting said second and third containers to one another, a liquid in said second and third containers adapted to be heated in said third container by solar energy incident on said surface of said third container and adapted to be circulated via said flow lines through said second container whereby the heated liquid in said second and third containers flows past and heats said second metallic sheet to supply additional heat to the liquid in said first container, and fittings in said first container for interconnecting the heated liquid in said first container to external equipment.

6. The solar boiler of claim 5 wherein said first, second and third metallic sheets are substantially flat and are disposed in substantially parallel planar relation to one another.

7. The solar boiler of claim 6 wherein said surface of said third container is also substantially flat and is disposed in laterally spaced substantially parallel planar relation to said first, second and third sheets.

8. The solar boiler of claim 5 wherein the liquid in said first container is different from the liquid in said second and third containers.

9. The solar boiler of claim 8 wherein the liquid in said first container is water and the different liquid in said second and third containers has a higher boiling point than water.

* * * * *